US012766870B2

(12) United States Patent
Sano

(10) Patent No.: US 12,766,870 B2
(45) Date of Patent: Oct. 20, 2026

(54) BOOKLET PRODUCTION APPARATUS

(71) Applicant: CANON KABUSHIKI KAISHA, Tokyo (JP)

(72) Inventor: Tetsuya Sano, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 18/945,394

(22) Filed: Nov. 12, 2024

(65) Prior Publication Data

US 2025/0153498 A1 May 15, 2025

(30) Foreign Application Priority Data

Nov. 15, 2023 (JP) ................................ 2023-194328

(51) Int. Cl.

*B42C 9/00* (2006.01)
*B42C 19/02* (2006.01)
*G03G 15/00* (2006.01)

(52) U.S. Cl.

CPC ............ *B42C 9/0081* (2013.01); *B42C 19/02* (2013.01); *G03G 15/6544* (2013.01)

(58) Field of Classification Search

None

See application file for complete search history.

(56) References Cited

U.S. PATENT DOCUMENTS 4,978,055 A * 12/1990 Miller ............... B29C 66/81871 150/147
8,838,014 B2 * 9/2014 Matsue .............. G03G 15/6544 399/408
2006/0169388 A1 * 8/2006 Shimizu .............. B29C 66/1122 156/580.2

FOREIGN PATENT DOCUMENTS

EP 4270112 A1 11/2023
JP 2005162352 A 6/2005
JP 2013043751 A 3/2013
JP 2014111501 A 6/2014
JP 2015168141 A 9/2015
JP 6202377 B2 9/2017
JP 2023164081 A 11/2023

* cited by examiner

*Primary Examiner* — Arlene Heredia Ocasio
(74) *Attorney, Agent, or Firm* — Canon U.S.A., Inc. IP Division

(57) ABSTRACT

A booklet production apparatus includes a heating and pressurizing unit that heats and pressurizes an adhesive layer formed on each of a plurality of sheets stacked on each other and includes a pressurizing plate that is brought into contact with and pressurizes the sheets, a heating element that heats the pressurizing plate, a receiving member facing the pressurizing plate, and a pressurizing mechanism that applies pressure to the sheets between the pressurizing plate and the receiving member. The booklet production apparatus produces a booklet by holding the sheets between the pressurizing plate and the receiving member and heating and pressurizing the adhesive layer formed along a side of each sheet, wherein in a region of the adhesive layer, the pressure is higher at an area close to a central part of each sheet than an area close to the side of each sheet in a direction perpendicular to the side.

6 Claims, 9 Drawing Sheets

BOOKLET PRODUCTION APPARATUS

BACKGROUND OF THE INVENTION

Field of the Invention

The present invention relates to a booklet production apparatus that produces a booklet by bonding sheets together using toner formed on the sheets.

Description of the Related Art

Japanese Patent Application Laid-Open No. 2013-43751 discusses an apparatus that produces a booklet by bonding together a plurality of sheets using toner after images are formed on the plurality of sheets by an image forming unit.

The apparatus discussed in Japanese Patent Application Laid-Open No. 2013-43751 includes a mechanism for heating and pressurizing sheets to bond the sheets together in a simple manner, and variations in components making up the mechanism can lead to weakening of the adhesive force between the sheets at a position closer to a central part of the booklet. When a user opens the booklet, stress is concentrated at a position in the bonding area that is closer to the central part of the sheets, and if the adhesive force at the position closer to the central part of the sheets is weakened, the sheets may be separated from each other unintendedly.

The present invention is directed to providing a booklet production apparatus that can produce a booklet with a strong adhesive force at a position in a bonding area that is closer to a central part of sheets to prevent the sheets from being separated from each other unintendedly when a user opens the booklet.

SUMMARY OF THE INVENTION

According to an aspect of the present invention, a booklet production apparatus includes a heating and pressurizing unit configured to heat and pressurize an adhesive layer formed on each of a plurality of sheets in a state where the plurality of sheets is stacked on each other, wherein the heating and pressurizing unit includes a pressurizing plate configured to be brought into contact with the plurality of sheets and pressurize the plurality of sheets, a heating element configured to heat the pressurizing plate, a receiving member provided opposite the pressurizing plate, and a pressurizing mechanism configured to apply pressure to the plurality of sheets held between a first surface of the pressurizing plate and a second surface of the receiving member. The booklet production apparatus produces a booklet by holding the plurality of sheets between the pressurizing plate and the receiving member and heating and pressurizing the adhesive layer formed along a side of each sheet, wherein in a region of the adhesive layer, the pressure is higher at an area close to a central part of each sheet than an area close to the side of each sheet in a direction perpendicular to the side.

Further features of the present invention will become apparent from the following description of embodiments with reference to the attached drawings.

DESCRIPTION OF THE EMBODIMENTS

Sheet support apparatuses and image forming apparatuses according to the present disclosure will be described below with reference to the drawings. The image forming apparatuses include printers, copying machines, scanners, and multi-function peripherals including these functions. Further, the sheet support apparatuses include apparatuses (discharge apparatuses) that support sheets discharged from a main body of an apparatus such as an image forming apparatus, apparatuses (feed apparatuses) that support sheets that are to be fed to a main body of an apparatus, and apparatuses that temporarily support sheets that are to be passed from an apparatus to another apparatus.

[Image Forming Apparatus]

Figure 1:
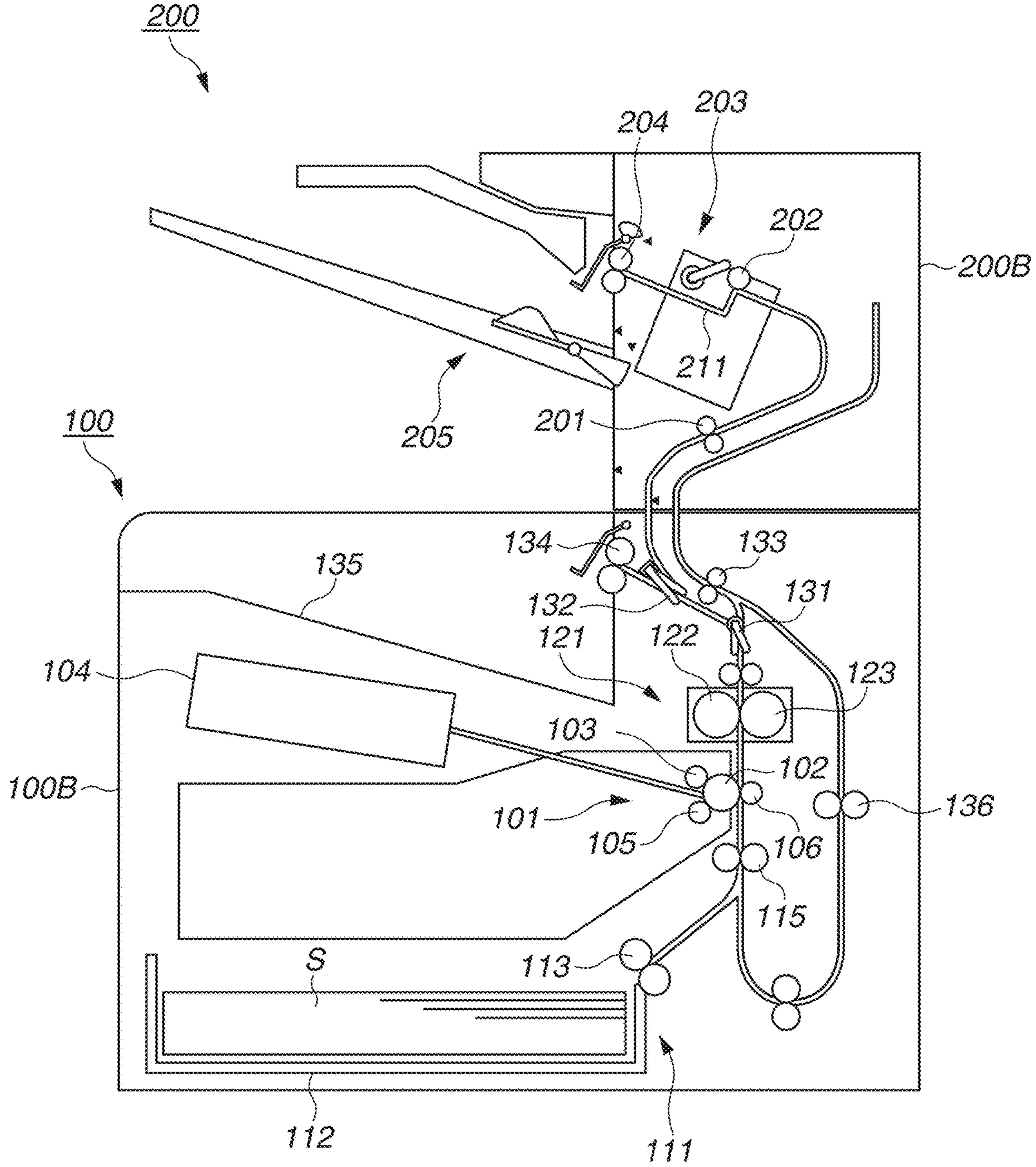
FIG. 1 is a cross sectional view illustrating an image forming apparatus and a booklet production apparatus according to a first embodiment.

First, an image forming apparatus and a booklet production apparatus according to a first embodiment will be described below with reference to FIG. 1. An image forming apparatus 100 is a monochrome digital printer configured to form images on sheets S based on image information input from external devices, such as personal computers.

The sheets S refer to thin film recording mediums, such as paper (e.g., sheets and envelopes), plastic films (e.g., sheets for overhead projectors (OHT)), and fabrics. Above a printer main body 100B that is a main body of the image forming apparatus 100, a booklet production apparatus 200 is attached. The booklet production apparatus 200 processes sheets S output from the printer main body 100B.

The image forming apparatus 100 forms images on sheets S using an image forming unit 101 including a photosensitive drum 102 and using an electrophotographic method. The image forming unit 101 is an example of an image forming unit configured to form images on sheets S. The photosensitive drum 102 is a cylindrical photosensitive member and is rotatable along a conveyance direction (upward in FIG. 1) of the sheets S. Around the photosensitive drum 102, a charging roller 103, a development device 105, and a transfer roller 106 are arranged along the rotation direction of the photosensitive drum 102.

The image forming unit 101 forms a toner image through the following image forming process. First, the charging roller 103 uniformly charges a surface of the photosensitive drum 102. The charged photosensitive drum 102 is exposed to scanning light emitted from an exposure device 104 to draw an electrostatic latent image on the charged photosensitive drum 102 based on image information. The development device 105 supplies charged toner to the photosensitive drum 102 to develop the electrostatic latent image into a toner image. The toner image borne on the photosensitive drum 102 is transferred to a sheet S using a bias voltage applied to the transfer roller 106.

In the printer main body 100B, a sheet feed unit 111 for feeding sheets S and a fixing unit 121 for fixing toner images to sheets S are arranged. The sheet feed unit 111 includes a feed cassette 112 and feed rollers 113 and feeds sheets S stored in the feed cassette 112 one by one to the image forming unit 101. The feed cassette 112 serves as a storage unit for storing sheets S, and the feed rollers 113 serve as a feed unit. Each sheet S fed from the sheet feed unit 111 is corrected for skew by a pair of registration rollers 115 and thereafter conveyed to a transfer nip portion between the photosensitive drum 102 and the transfer roller 106, and a toner image is formed on the sheet S.

The sheet S with the unfixed image thereon, after being conveyed through the transfer nip portion, is held between a fixing roller 122 and a pressurizing roller 123 of the fixing unit 121 to pressurize and heat the sheet S, whereby the toner is melted, fused, and fixed to the sheet S. In cases of performing two-sided printing, the sheet S with the fixed image thereon is conveyed through a path selected by a two-side switching member 131 to a pair of reversing rollers 133. Then, the sheet S is switched back by the pair of reversing rollers 133 and thereafter conveyed to the image forming unit 101 again by a pair of two-side conveying rollers 136, and an image is formed on the back side of the sheet S.

After the completion of the one- or two-sided image output on the sheet S, if the sheet S is not to be subjected to post-processing, the sheet S is conveyed through a path selected by a discharge switching member 132 to a pair of discharge rollers 134 and is discharged to a discharge portion 135 formed in an upper portion of the printer main body 100B. Further, if the sheet S is to be subjected to post-processing, the sheet S is conveyed to the booklet production apparatus 200.

In a processing apparatus main body 200B of the booklet production apparatus 200, a pair of inlet rollers 201, a heating and pressurizing unit 203, and a pair of discharge rollers 204 are arranged. Further, the booklet production apparatus 200 includes a discharge tray 205 supported movably by the processing apparatus main body 200B. The pair of inlet rollers 201 receives the sheet S discharged from the printer main body 100B and conveys the received sheet S to the heating and pressurizing unit 203. The heating and pressurizing unit 203 includes a processing stage 211 and a processing stage roller 202. The processing stage 211 supports the sheet S, and the processing stage roller 202 ejects the sheet S to the processing stage 211. The heating and pressurizing unit 203 performs a bonding process on the sheet S placed on the processing stage 211. The sheet S having undergone the process is discharged to the discharge tray 205 by the pair of discharge rollers 204.

[Heating and Pressurizing Unit]

Figure 2:
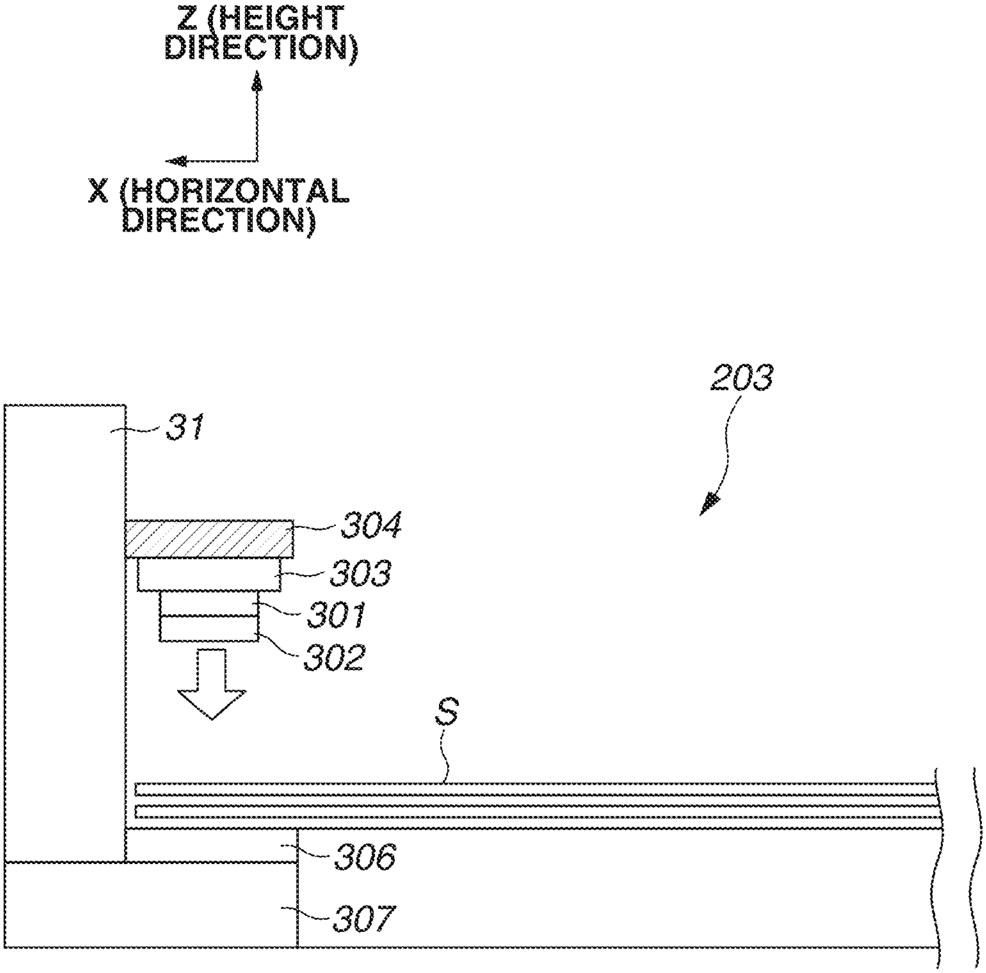
FIG. 2 is a cross sectional view illustrating a heating and pressurizing unit installed in the booklet production apparatus according to the first embodiment.

FIG. 2 is a schematic cross-sectional diagram illustrating the heating and pressurizing unit 203. The heating and pressurizing unit 203 includes a ceramic heater (heating element) 301 and a pressurizing plate 302 disposed on the ceramic heater 301. The ceramic heater 301 incorporates a heat-generating element as a heat source therein and has a thickness of 1.0 millimeter (mm). The pressurizing plate 302 has a thickness of 1.0 mm and is made of aluminum. A temperature detection unit (not illustrated) and a power application unit (not illustrated) supported by a heater support member 303 control the temperature of the ceramic heater 301 to a target temperature of 240° C., thereby controlling the surface temperature of the pressurizing plate 302 to 200° C. Further, the ceramic heater 301 is supported by the heater support member 303 made of resin. A pressurizing lever 304 receives power from a drive source (not illustrated) to push the ceramic heater 301 and the pressurizing plate 302 in a-Z direction (downward), thereby applying pressure to the stack of sheets P. The pressurizing lever 304 applies the pressure to the sheets S via the pressurizing plate 302 to achieve an average surface pressure of 0.2 MPa. A receiving member 306 is a silicone rubber plate having a thickness of 2.0 mm and is supported by a receiving member support member 307 made of resin. The receiving member 306 is provided opposite the pressurizing plate 302 and serves as a member for absorbing the pressure applied by the pressurizing plate 302. Further, there are cases where the pressurizing plate 302 directly heats and pressurizes an adhesive layer on the sheet S, so that, in order to prevent surface contamination, a release layer may be provided on the surface.

Figure 3:
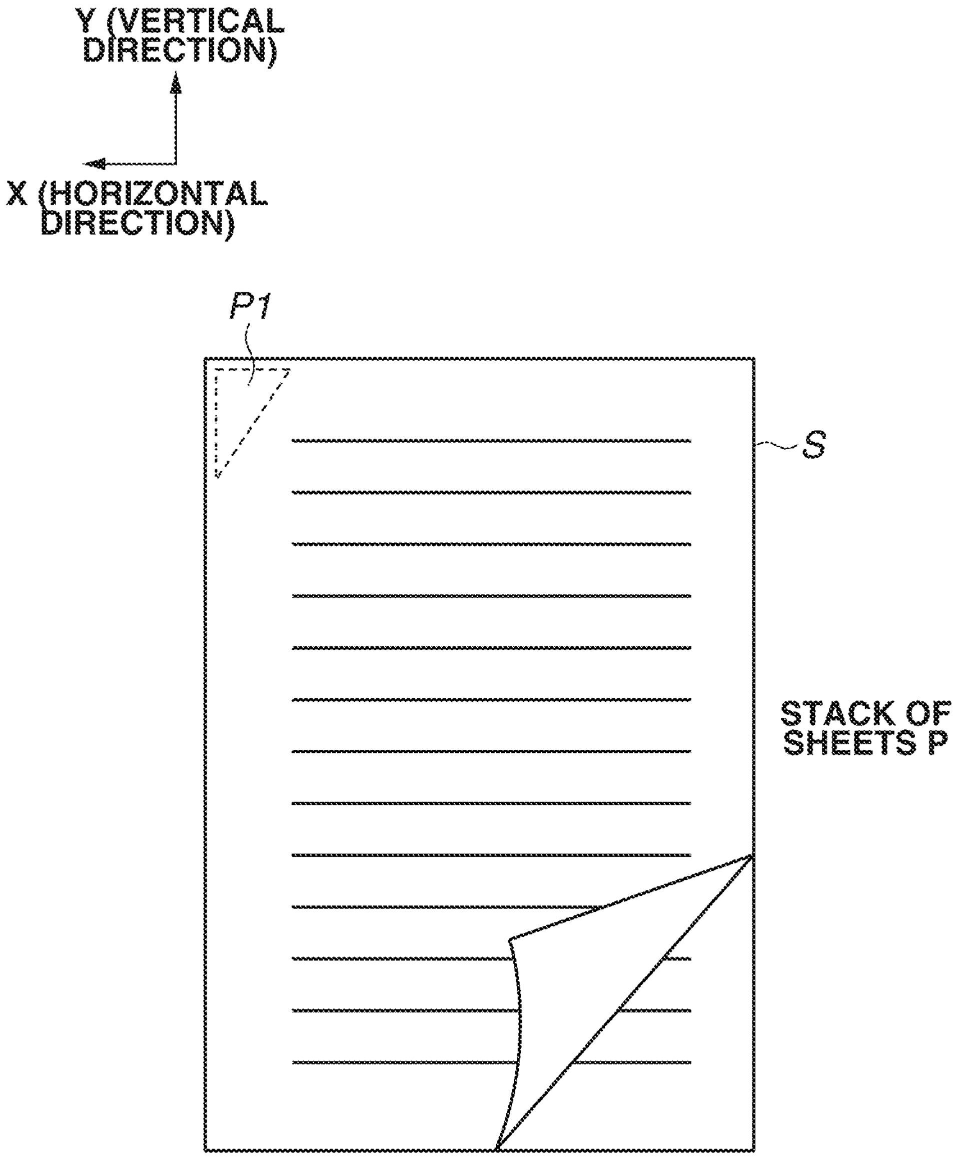
FIG. 3 illustrates an example of a booklet that is produced according to the first embodiment.

As illustrated in FIG. 3, an adhesive layer P1 is formed on a corner area (inside the portion that is pressurized by the pressurizing plate 302 of the heating and pressurizing unit 203) of the sheet S. An area of the sheet S that is subjected to pressure application by the pressurizing plate 302 is substantially triangular in shape and has dimensions of 13 mm in an X direction (horizontal direction) and 25 mm in a Y direction (vertical direction). The plurality of sheets S each with the adhesive layer P1 thereon is stacked and held between the pressurizing plate 302 heated by the ceramic heater 301 and the receiving member 306. Then, a pressurizing mechanism 31 pressurizes the pressurizing plate 302 toward the receiving member 306 to heat and pressurize the adhesive layers P1, whereby the sheets S are bonded together to produce a booklet.

Figure 4A:
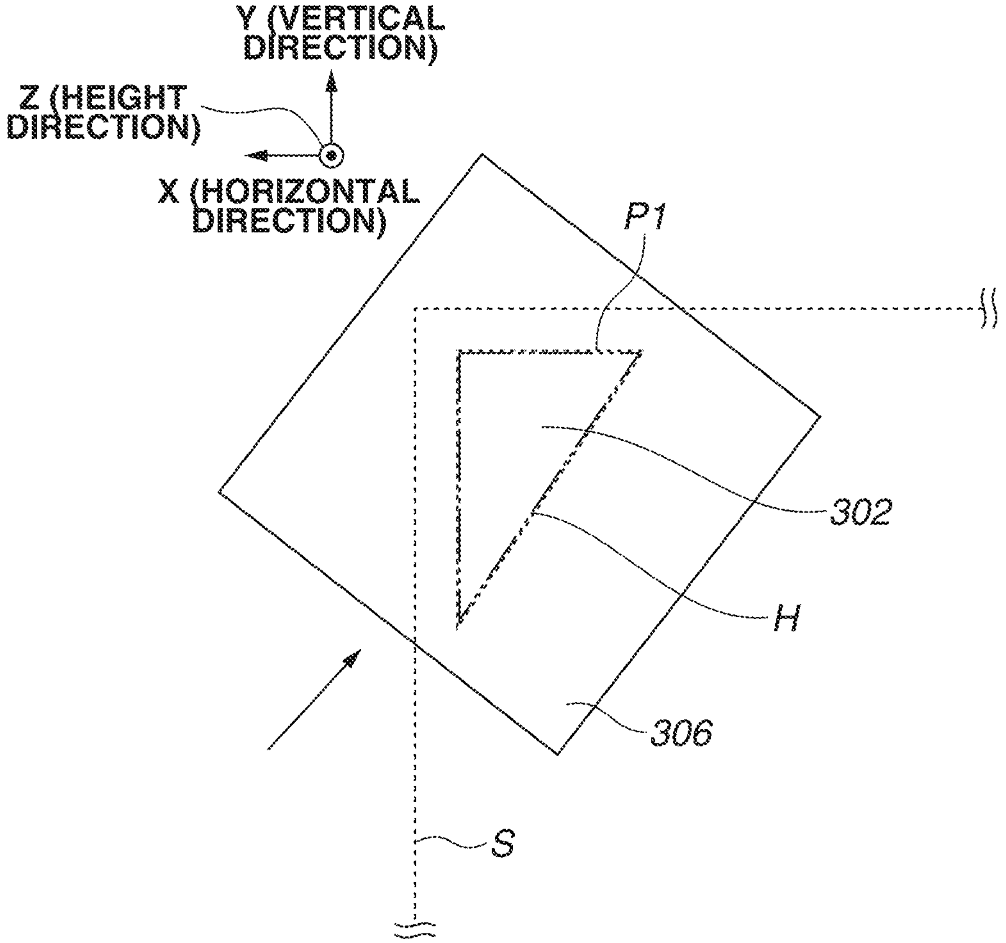
FIGS. 4A and 4B are a top view and a side view, respectively, illustrating the heating and pressurizing unit according to the first embodiment.
Figure 4B:
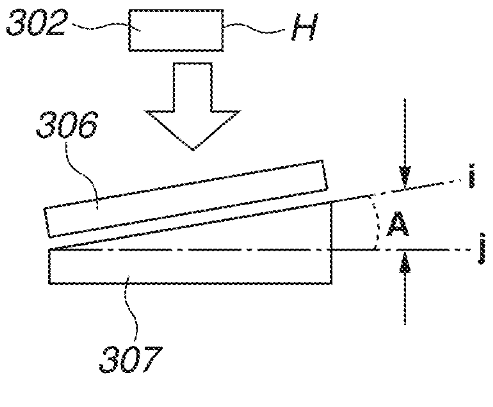

FIG. 4A is a schematic diagram illustrating a positional relationship between the pressurizing plate 302 and the receiving member 306 as viewed from a pressurizing direction (Z direction) of the sheets S, and FIG. 4B is a schematic diagram illustrating a positional relationship between the pressurizing plate 302 and the receiving member 306 as viewed from an arrow direction in FIG. 4A. As illustrated in FIGS. 4A and 4B, the receiving member 306 is supported by the receiving member support member 307 so as to be tilted toward an oblique portion H of the triangular shape, which is a spread portion on the printing area side. More specifically, the receiving member 306 is supported to be tilted so that a support surface i of the receiving member support member 307 forms an angle A of 1 degree to 15 degrees relative to a horizontal surface j. Thus, a first surface of the pressurizing plate 302 that comes into contact with the sheet S and a second surface of the receiving member 306 that comes into contact with the sheet S form a relative angle of 1 degree to 15 degrees. Further, the second surface of the receiving member 306 that comes into contact with the sheet S is tilted at an angle of 1 degree to 15 degrees relative to a surface perpendicular to the direction in which the pressurizing mechanism 31 moves the pressurizing plate 302 toward the receiving member 306. The first surface and the second surface may both be tilted relative to the surface perpendicular to the direction in which the pressurizing mechanism 31 moves the pressurizing plate 302 toward the receiving member 306, as long as the relative angle between the first surface and the second surface is 1 degree to 15 degrees.

This makes it possible to increase the pressure (surface pressure) at the oblique portion H side when the stack of sheets P is pressurized using the pressurizing plate 302. Specifically, in a region of the adhesive layer P1, the pressure is higher at an area close to a central part of the sheet S than an area close to the corner area of the sheet S in a direction of a diagonal line of the sheet S. As a result, the oblique portion H side of the pressurizing plate 302 is actively pressed against the stack of sheets P, which makes it possible to increase the pressure on the oblique portion H side while preventing pressure release on the oblique portion H side, i.e., on the spread side. This ensures adhesion between the sheets S, which results in stable adhesiveness for the spread portion. In cases where the tilt of the pressurizing plate 302 in a direction of the printing area is less than 1 degree, the desired pressure effects may not be obtained, and pressure release may occur. Further, in cases where the tilt is greater than 15 degrees, it becomes difficult to secure the necessary contact area in a triangular shape. Therefore, these cases are unsuitable.

Figure 5A:
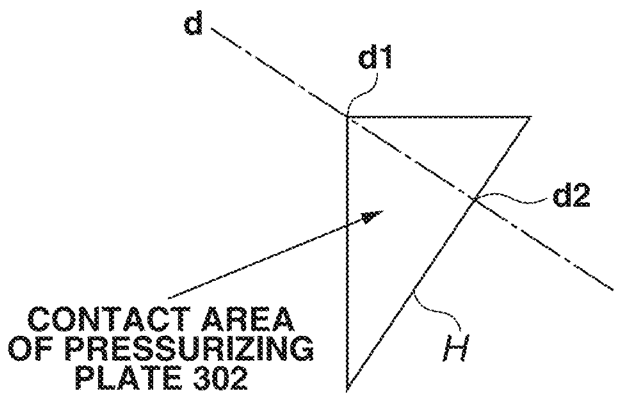
FIGS. 5A and 5B are schematic diagrams illustrating pressure distributions of the heating and pressurizing unit according to the first embodiment.
Figure 5B:
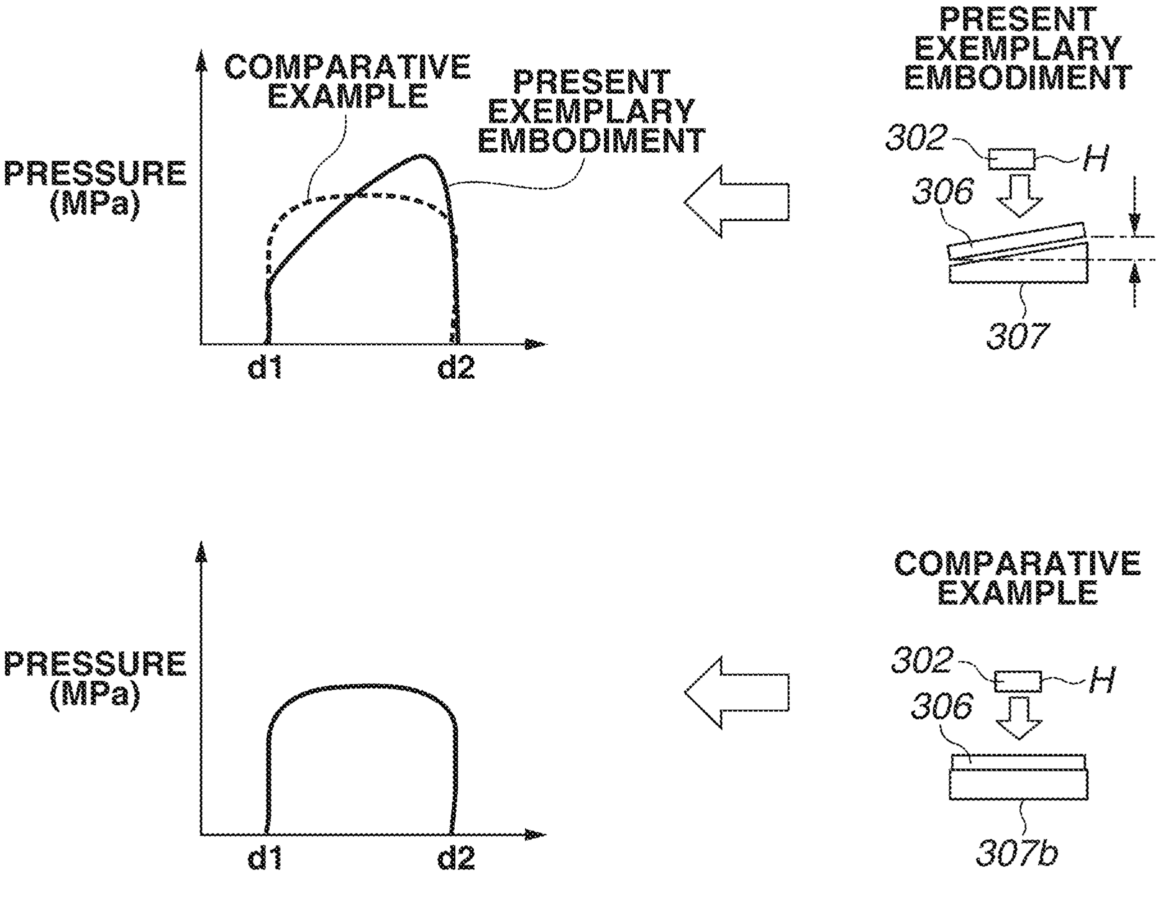

FIGS. 5A and 5B are diagrams illustrating the results of measuring pressure distributions with the pressurizing plate 302 pressurized in the heating and pressurizing unit 203 according to the present embodiment. The results of a comparative example in which the receiving member support member 307 is provided without being tilted will also be described below. The pressure distributions were measured using a pressure distribution measurement system "I-SCAN" manufactured by Nitta Corporation, and pressure values along a line-d portion were extracted from the pressure distribution measurement data of the contact area (triangular portion) of the pressurizing plate 302 illustrated in FIG. 5A. From FIG. 5B, it can be seen that the pressure at the oblique portion H (=d2) is the same as at other portions in the comparative example whereas the pressure at the oblique portion H (=d2), which is the spread side, is higher than at other portions in the present embodiment.

(Adhesive Strength Measurement using Tensile Testing Machine)

Figure 6:
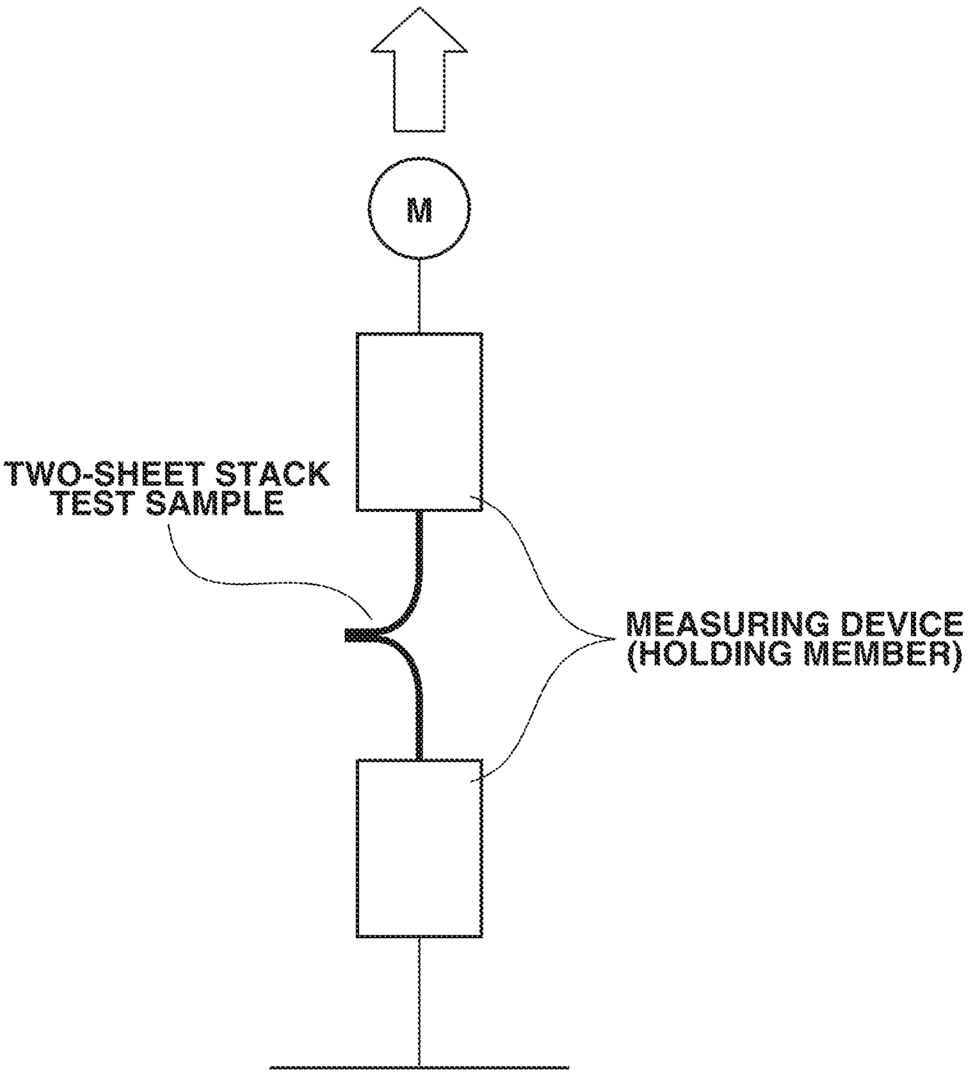
FIG. 6 is a schematic diagram illustrating a tensile test procedure according to the first embodiment.

Adhesive strength measurements were conducted on the prepared stacks of sheets using a tensile testing machine (Tensilon testing machine RTG-1225) manufactured by A & D Company, Ltd. The slopes of the initial rising portions and the maximum tensile strengths of the tensile stress-strain curves obtained at room temperature (23° C.) and a test speed of 50 mm/minute were compared and evaluated to determine adhesive strengths. Specifically, as illustrated in FIG. 6, two-sheet stack test samples each having a predetermined width (10-mm width) were prepared, and tensile tests were conducted on the test samples using the tensile testing machine. The evaluation was conducted by preparing five sample stacks and comparing the maximum tensile strengths of the sample stacks. In the tests, if the tensile strength per unit length was 1.0 N/mm or greater, it was determined that sufficient adhesive strength was achieved. Table 1 presents the results of adhesive strength measurements by the tensile testing machine.

TABLE 1

Tensile Test Results

| Tensile Strength (N/mm) | Present Embodiment | Comparative Example |
|---|---|---|
| Average | 1.28 | 0.82 |
| Sample 1 | 1.5 | 1.0 |
| Sample 2 | 1.2 | 0.7 |
| Sample 3 | 1.0 | 0.8 |
| Sample 4 | 1.4 | 0.7 |
| Sample 5 | 1.3 | 0.9 |

As presented in Table 1, some of the tensile strengths in the comparative example are 1.0 or less, which indicates that sufficient adhesive force is not achieved, whereas all of the tensile strengths in the present embodiment are 1.0 (N/mm) or greater, which indicates that sufficient adhesive force is achieved. In the present embodiment, an example in which the sheets S are pressurized at a constant pressure is described. However, the desired adhesive force can also be achieved using, for example, variable pressure. In this case, the oblique portion H is also actively pressed at a predetermined pressure, which makes it possible to ensure adhesion on the spread side (the oblique portion H) and consistently achieve the desired adhesive strength. In the present embodiment, the receiving member 306 is tilted toward the oblique portion H side, which is the spread side. However, similar effects can also be achieved by employing a configuration with increased pressure (surface pressure) on the oblique portion H side as a configuration that the pressurizing plate 302 is similarly tiled.

Figure 7A:
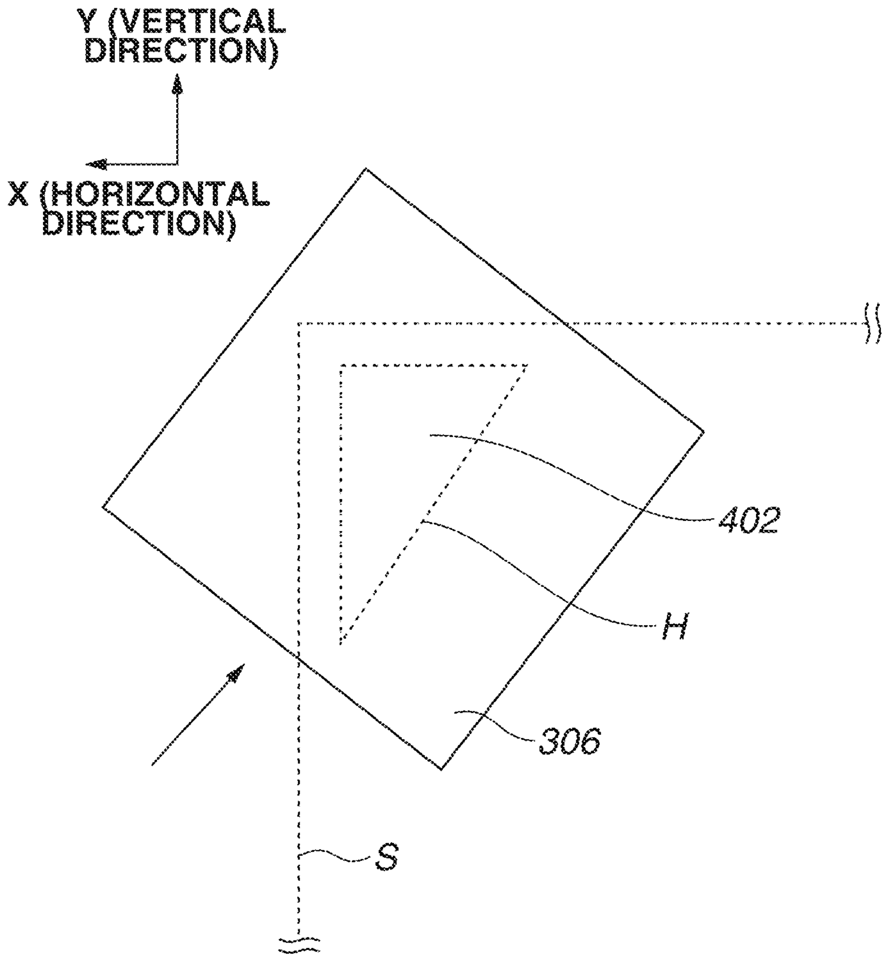
FIGS. 7A and 7B are a top view and a side view, respectively, illustrating a heating and pressurizing unit according to a second embodiment.
Figure 7B:
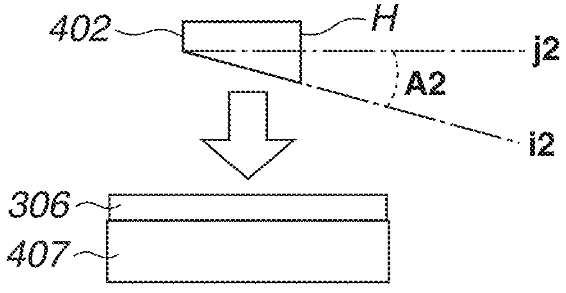
Figure 8A:
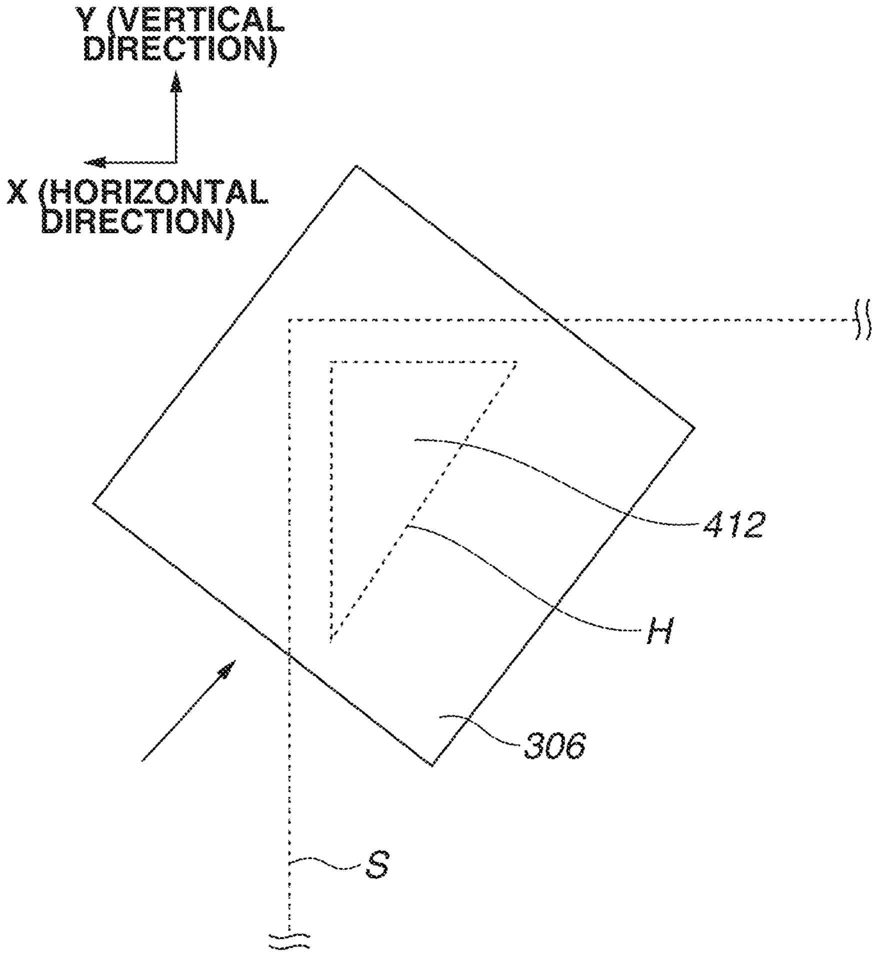
FIGS. 8A and 8B are a top view and a side view, respectively, illustrating a heating and pressurizing unit according to a modified example of the second embodiment.
Figure 8B:
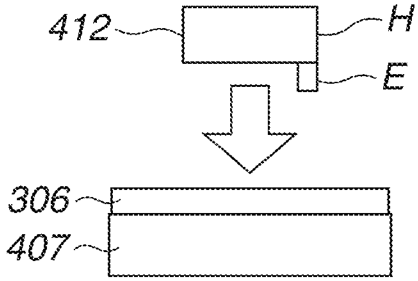

FIGS. 7A and 7B are schematic diagrams illustrating a positional relationship between a pressurizing plate and a receiving member according to a second embodiment. Further, FIGS. 8A and 8B are schematic diagrams illustrating a positional relationship between a pressurizing plate and a receiving member according to a modified example of the second embodiment. The present embodiment is an example in which the shape of the pressurizing plate is changed and the pressure on the spread side is increased. Descriptions of components similar to those described above in the first embodiment will be omitted. As illustrated in FIG. 7A, in the present embodiment, a pressurizing plate 402 is used instead of the pressurizing plate 302 described in the first embodiment, and a receiving member support member 407 is provided horizontally. The pressurizing plate 402 is a pressurizing plate made of aluminum, and as illustrated in FIG. 7B, the pressurizing plate 402 is supported to be tilted so that a heating and pressurizing surface i2 forms an angle A2 of 1 degree to 15 degrees relative to a horizontal surface j2 by adjusting the thickness toward the oblique portion H. Thus, a first surface of the pressurizing plate 402 that comes into contact with the sheets S and a second surface of the receiving member 306 that comes into contact with the sheets S form a relative angle of 1 degree to 15 degrees. Further, the first surface of the pressurizing plate 402 that comes into contact with the sheets S is tilted by 1 degree to 15 degrees relative to a surface perpendicular to a direction in which the pressurizing mechanism 31 moves the pressurizing plate 402 toward the receiving member 306. The first surface and the second surface may both be tilted relative to the surface perpendicular to the direction in which the pressurizing mechanism 31 moves the pressurizing plate 402 toward the receiving member 306, as long as the relative angle between the first surface and the second surface is 1 degree to 15 degrees. In cases where the relative angle is less than 1 degree, it is difficult to achieve the effect of increasing the pressure. On the other hand, in cases where the relative angle is greater than 15 degrees, issues with the position accuracy of the pressurizing plate as a pressurizing plate supporting method can arise. Therefore, these cases are undesirable.

Further, as illustrated in FIGS. 8A and 8B, in the modified example of the second embodiment, a pressurizing plate 412 is used instead of the pressurizing plate 402, and a projection E corresponding to the oblique portion H extends outward by 0.05 mm to 1.0 mm from the other area. In cases where the projection E has a height of, for example, 0.05 mm or less, it is difficult to achieve the effect of increasing the pressure. On the other hand, in cases where the height is 1.0 mm or greater, pressure release is more likely to occur at uneven portions. Therefore, these cases are undesirable. The present embodiment makes it possible to increase the pressure at the oblique portion H, which is the spread side, and ensures adhesion at the spread portion, which results in achieving a stable adhesive force for the spread portion.

In the present embodiment, test samples were prepared as in the first embodiment, and tensile tests were conducted to evaluate adhesive forces. The evaluation revealed that good adhesiveness was achieved.

Figure 9A:
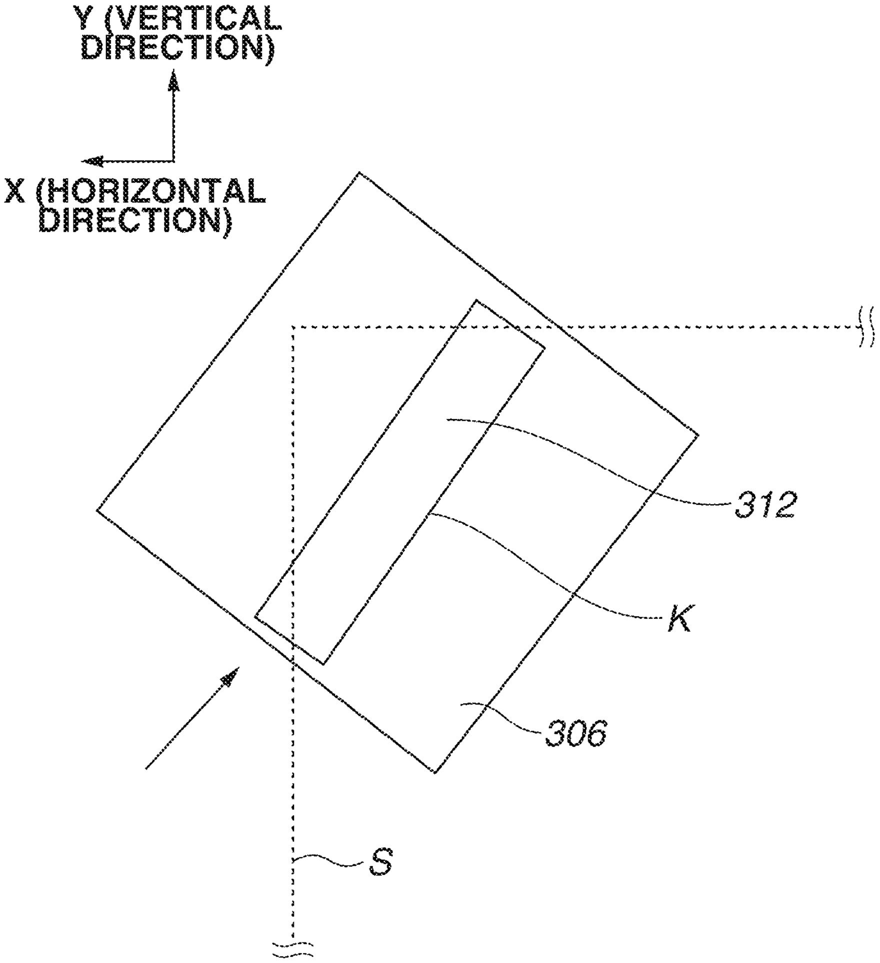
FIGS. 9A and 9B are a top view and a side view, respectively, illustrating a heating and pressurizing unit according to a third embodiment.
Figure 9B:
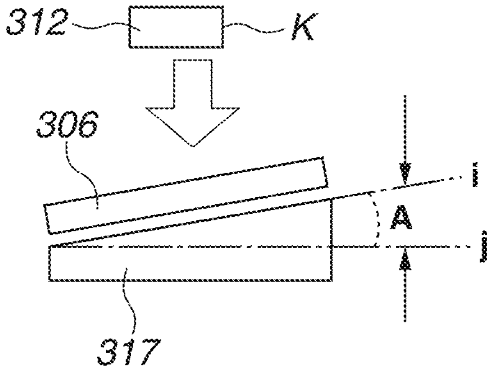

FIGS. 9A and 9B are schematic diagrams illustrating a positional relationship between a pressurizing plate and a receiving member according to a third embodiment. In the present embodiment, the shape of the contact area of the heating and pressurizing surface of the pressurizing plate is changed to a rectangular shape from the triangular shape in the first embodiment. Descriptions of components similar to those described above in the first embodiment will be omitted. As illustrated in FIG. 9A, a pressurizing plate 312 is arranged so that the longer sides of the rectangular-shaped heating surface align with the spread portion K of the sheets S. Further, as illustrated in FIG. 9B, a receiving member support member 317 supports the receiving member 306 so that the receiving member 306 is tilted diagonally toward the spread portion K in a height direction in the present embodiment, as with the first embodiment. This makes it possible to increase the pressure at the spread portion K and ensure adhesion of the spread portion K, which results in achieving a stable adhesive force. Further, since the pressurizing plate 312 is rectangular, restrictions on manufacturing the pressurizing plate 312 are reduced. For example, the pressurizing plate 312 can be molded using a less expensive method, such as an extrusion process.

As a fourth embodiment, a booklet may be produced using a sheet on which an adhesive layer is formed along a side of the sheet. In this case, in a region of the adhesive layer, the pressure is set to be higher at an area close to the central part of the sheet than an area close to the side of the sheet in a direction perpendicular to the side. To achieve higher pressure at the area close to the central part of the sheet, the configuration of the heating and pressurizing unit according to any one of the first to third embodiments may be used. The present embodiment can obtain the effect of preventing pressure release, similar to the first to third embodiments.

Additional Remarks

The foregoing embodiments at least disclose the following booklet production apparatuses.

Item 1

A booklet production apparatus comprising, a heating and pressurizing unit configured to heat and pressurize an adhesive layer formed on each of a plurality of sheets in a state where the plurality of sheets is stacked on each other, the heating and pressurizing unit including, a pressurizing plate configured to be brought into contact with the plurality of sheets and pressurize the plurality of sheets, a heating element configured to heat the pressurizing plate, a receiving member provided opposite the pressurizing plate, and a pressurizing mechanism configured to apply pressure to the plurality of sheets held between the pressurizing plate and the receiving member, the booklet production apparatus being configured to produce a booklet by holding the plurality of sheets between the pressurizing plate and the receiving member and heating and pressurizing the adhesive layer formed along a side of each sheet, wherein in a region of the adhesive layer, the pressure is higher at an area close to a central part of each sheet than an area close to the side of each sheet in a direction perpendicular to the side.

Item 2

The booklet production apparatus according to item 1, wherein the plurality of sheets is heated and pressurized with a second surface of the receiving member forming an angle with a first surface of the pressurizing plate so that the pressure becomes higher at the area close to the central part of each sheet than the area close to the side of each sheet, the first surface and the second surface being brought into contact with the plurality of sheets.

Item 3

The booklet production apparatus according to item 2, wherein the first surface forms an angle with a surface perpendicular to a direction in which the pressurizing mechanism moves the pressurizing plate toward the receiving member.

Item 4

The booklet production apparatus according to item 2 or 3, wherein the second surface forms an angle with a surface perpendicular to a direction in which the pressurizing mechanism moves the pressurizing plate toward the receiving member.

Item 5

The booklet production apparatus according to item 1, wherein the pressurizing plate includes a projection extending toward the plurality of sheets at a position close to the central part of each sheet on a surface of the pressurizing plate that comes into contact with plurality of sheets, and the pressure applied to the plurality of sheets is high at the position of the projection.

Item 6

A booklet production apparatus comprising, a heating and pressurizing unit configured to heat and pressurize an adhesive layer formed on each of a plurality of sheets in a state where the plurality of sheets is stacked on each other, the heating and pressurizing unit including, a pressurizing plate configured to be brought into contact with the plurality of sheets and pressurize the plurality of sheets, a heating element configured to heat the pressurizing plate, a receiving member provided opposite the pressurizing plate, and a pressurizing mechanism configured to apply pressure to the plurality of sheets held between the pressurizing plate and the receiving member, the booklet production apparatus being configured to produce a booklet by holding the plurality of sheets between the pressurizing plate and the receiving member and heating and pressurizing the adhesive layer formed on a corner of each sheet, wherein in a region of the adhesive layer, the pressure is higher at an area close to a central part of each sheet than an area close to the corner of each sheet in a direction of a diagonal line of the sheet.

Item 7

The booklet production apparatus according to item 6, wherein the plurality of sheets is heated and pressurized with a second surface of the receiving member forming an angle with a first surface of the pressurizing plate so that the pressure becomes higher at the area close to the central part of each sheet than the area close to the corner area of each sheet, the first surface and the second surface being brought in contact with the plurality of sheets.

Item 8

The booklet production apparatus according to item 7, wherein the first surface forms an angle with a surface perpendicular to a direction in which the pressurizing mechanism moves the pressurizing plate toward the receiving member.

Item 9

The booklet production apparatus according to item 7 or 8, wherein the second surface forms an angle with a surface perpendicular to a direction in which the pressurizing mechanism moves the pressurizing plate toward the receiving member.

Item 10

The booklet production apparatus according to item 6, wherein the pressurizing plate includes a projection extending toward the plurality of sheets at a position close to the central part of each sheet on a surface of the pressurizing plate that comes into contact with plurality of sheets, and the pressure applied to the plurality of sheets is high at the position of the projection.

The present invention makes it possible to provide a booklet production apparatus that can produce a booklet with a strong adhesive force at a position in a bonding area that is closer to a central part of sheets to prevent the sheets from being separated from each other unintendedly when a user opens the booklet.

While the present invention has been described with reference to embodiments, it is to be understood that the invention is not limited to the disclosed embodiments but is defined by the scope of the following claims.

This application claims the benefit of Japanese Patent Application No. 2023-194328, filed Nov. 15, 2023, which is hereby incorporated by reference herein in its entirety.

What is claimed is:

1. A booklet production apparatus comprising:

a heating and pressurizing unit configured to heat and pressurize an adhesive layer formed on each of a plurality of sheets in a state where the plurality of sheets is stacked on each other, the heating and pressurizing unit including:

a pressurizing plate configured to be brought into contact with the plurality of sheets and pressurize the plurality of sheets, a heating element configured to heat the pressurizing plate, a receiving member provided opposite the pressurizing plate, and a pressurizing mechanism configured to apply pressure to the plurality of sheets held between a first surface of the pressurizing plate and a second surface of the receiving member, the booklet production apparatus being configured to produce a booklet by holding the plurality of sheets between the pressurizing plate and the receiving member and heating and pressurizing the adhesive layer formed along a side of each sheet, wherein in a region of the adhesive layer, the pressure is higher in an area closer to a central part of each sheet than in an area closer to the side of each sheet in a direction perpendicular to the side, and wherein the second surface of the receiving member forms an angle with the first surface of the pressurizing plate so that the pressure becomes higher in the area closer to the central part of each sheet than in the area closer to the side of each sheet when the first surface and the second surface are brought into contact with the plurality of sheets.

2. The booklet production apparatus according to claim 1, wherein the angle between the first surface and the second surface is in the range 1 degree to 15 degrees.

3. The booklet production apparatus according to claim 1, wherein at least one of the first surface and the second surface forms an angle with a surface perpendicular to a direction in which the pressurizing mechanism moves the pressurizing plate toward the receiving member.

4. A booklet production apparatus comprising, a heating and pressurizing unit configured to heat and pressurize an adhesive layer formed on each of a plurality of sheets in a state where the plurality of sheets is stacked on each other, the heating and pressurizing unit including, a pressurizing plate configured to be brought into contact with the plurality of sheets and pressurize the plurality of sheets, a heating element configured to heat the pressurizing plate, a receiving member provided opposite the pressurizing plate, and a pressurizing mechanism configured to apply pressure to the plurality of sheets held between a first surface of the pressurizing plate and a second surface of the receiving member, the booklet production apparatus being configured to produce a booklet by holding the plurality of sheets between the pressurizing plate and the receiving member and heating and pressurizing the adhesive layer formed on a corner of each sheet, wherein in a region of the adhesive layer, the pressure is higher in an area closer to a central part of each sheet than in an area closer to the corner of each sheet in a direction of a diagonal line of the sheet passing through the corner, and wherein the second surface of the receiving member forms an angle with the first surface of the pressurizing plate so that the pressure becomes higher in the area closer to the central part of each sheet than in the area closer to the corner of each sheet when the first surface and the second surface are brought into contact with the plurality of sheets.

5. The booklet production apparatus according to claim 4, wherein the angle between the first surface and the second surface is in the range 1 degree to 15 degrees.

6. The booklet production apparatus according to claim 4, wherein at least one of the first surface and the second surface forms an angle with a surface perpendicular to a direction in which the pressurizing mechanism moves the pressurizing plate toward the receiving member.

* * * * *